March 25, 1969   J. W. DE DAPPER   3,434,426
COMBINED IGNITOR AND PROPELLENT GRAIN
Filed Nov. 30, 1956

INVENTOR.
JAY W. DE DAPPER
BY Thomas S. MacDonald
ATTORNEY 3,434,426
COMBINED IGNITOR AND PROPELLENT GRAIN
Jay W. De Dapper, 10421 Lesterford Ave.,
Downey, Calif. 90241
Filed Nov. 30, 1956, Ser. No. 625,351
Int. Cl. F42c 11/00; F42b 5/16, 9/08
U.S. Cl. 102—100                                    7 Claims The present invention is directed to a combined propellent ignitor and propellent grain. More particularly this invention concerns providing a pyrotechnic and conductive primer pattern and a conductive pattern over various surfaces of a propellent grain in a desired predetermined manner.

Heretofore various schemes have been proposed for igniting a propellent grain. Each of these prior art devices have taken the form of separate and discrete ignitors which are first ignited by an electrical squib or fuse. The provision of a separate ignitor adds expense to the device, is bulky and a source of non-reliability. The essence of the present invention is in combining the ignitor as a layer or film intimately bonded to the propellent grain. This eliminates the separate ignitor and its container, improves the heat transfer to the propellent grain, affords complete control over the ignition timing and sequence over any finite area of the grain and increases the reliability and reproducibility of the ignition process. Generally stated, the invention is a combined ignitor and solid propellent rocket comprising a formed propellent grain, conductive paths on surfaces of the grain, connecting paths of conductive pyrotechnic material extending between the conductive paths, there being electrical impulse means connected to said conductive paths, all of said paths being integrally bonded to said surfaces of said propellent grain.

An object of this invention is therefore to provide a combined propellent ignitor and propellent grain.

A further object of this invention is to provide a new and novel propellent grain.

A still further object of this invention is to provide a new and novel propellent ignitor.

An additional object of this invention is to provide a method of forming an integral ignitor on a propellent grain.

Another object of this invention is to provide a pattern of pyrotechnic and conductive primer material and a conductive material, each in a compatible binder, on predetermined surfaces of a propellent grain.

The above objects as well as other objects of this invention will be apparent from the following descriptions and the accompanying drawings in which:

FIGURE 2 is an outline view to show the split section along which FIG. 1 is taken, namely along the dotted lines 1—1 of FIG. 2.

Figure 1:
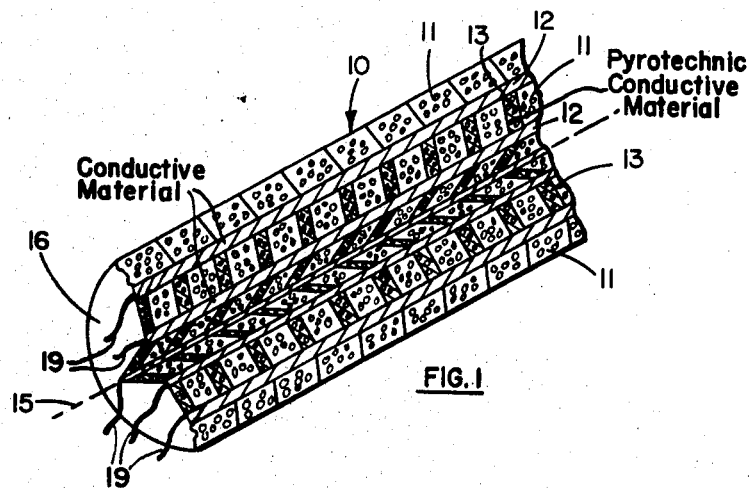
FIGURE 1 is a partial cutaway cross sectional of the combined ignitor and grain taken on the lines 1—1 of FIG. 2.
Figure 2:
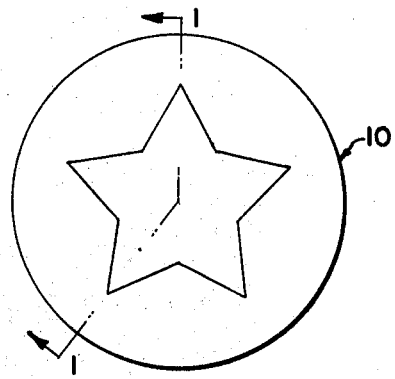
Figure 3:
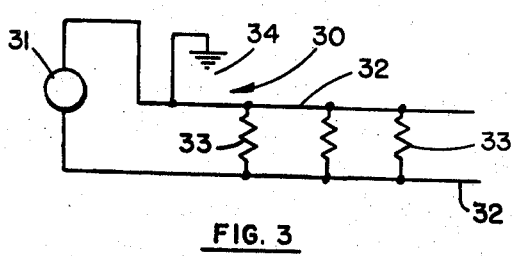
FIGURE 3 is a schematic view of an equivalent electrical circuit as concerns one group of the aforesaid conductive paths and connecting paths of conductive pyrotechnic material.

The overall propellent grain and ignitor is denoted in FIGURE 1 by the numeral 10. The grain 10 may be made up of a series of circular ring shape grains 11 positioned around a central axis 15. The grain can also be cast into the final shape directly followed by the hereinafter described coating steps. A layer or film 12 of a conductive material in a binder compatible with the grains 11 is applied to any desired surface of the series of rings. As shown the coatings are on a star-shaped interior surface. The layer or film 12 is placed on the grain in predetermined patterns, FIG. 3 showing an equivalent electrical circuit. A combined pyrotechnic and conductive material 13 is next applied to the grain so that this material at least abuts the other film or layer 12 in order to conduct an electrical current therethrough. In the alternative a conductive pattern can be applied followed by an overlay of primer material in selected areas. This primer layer provides the actual ignition for the under and over lying propellent grain. The combined pyrotechnic and conductive material is also applied using a suitable binder hereinafter discussed in detail. In the modification illustrated in FIG. 1 the conductive pyrotechnic primer material 13 is coated in either strips or patterns on parts of the propellent grain between the low resistance conductors 12 of opposite polarity. The number and spacing of the conductive strips are both variable and will depend upon matching the ignition requirements of particular propellent compositions and configurations. The various above recited layers are polymerized by a conventional curing process at elevated temperature with or without a suitable catalyst. Thermoplastic and thermosetting binders may be employed. Ignition of the propellent grain and ignitor of this invention is accomplished by the receipt of an electrical signal through any suitable electrical lead-in. The current requirements of the present combined ignitor and grain are relatively low when compared to the conventional type of ignitor. The resistance of the conductive primer material is essentially infinitely variable and can be limited to a value which will restrict the amount of current flow to that just sufficient to insure ignition.

It is to be realized that other means may be employed to complete the circuits through the conductive layers on the surface of the grain. For example, wires 19 may be directly precast into the conductive layers and connection made directly thereto from a source of voltage adapted to be actuated by an external signal. This source may be a separate or self-contained power supply associated with a rocket, rocket launcher or gas generator. The conductive ignitor of this invention can operate over a range of from 15 to 150 volts of direct or alternating current without the premature burning through at any point in the conductive patterns. The pattern of the primer material on the propellant grain may be varied in order to suit the desired ignition characteristics and requirements of the grain. Where a laminar or progressive burning lengthwise of the grain is desired the conductive and primer patterns may be placed on the end of the grain rather than on the grain interior surfaces as indicated. Such grain end is seen at 16 in FIG. 1.

FIGURE 3 shows an equivalent electrical circuit corresponding to one of the illustrated patterns of conductive paths and connecting paths of conductive pyrotechnic material extending therebetween. A voltage is supplied through a lead-in 31 connected in a circuit 30 which has conductive paths or strips 32 through which current is adapted to pass, these strips corresponding to the conductive films 12 previously described. A series of conductive primer paths, represented by the resistances 33 shown, connect the strips 32 electrically and correspond to the strips of conductive pyrotechnic material 13 previously described. As stated previously the primer paths may be overlays on conductive paths. It is to be understood that a switch or timer mechanism (not shown) is provided to trigger current flow from the power source to the ignition patterns. The circuit 30 is grounded as indicated at 34.

Figure 4:
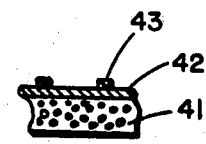
FIGURE 4 is a cross sectional view of a typical ignitor and grain section.

FIGURE 4 is a cross sectional view of a typical section of a propellant charge having the combined ignitor of this invention on a surface thereof. The charge 1 has a layer 42 thereon generally in the form of a discrete path or strip of a conductive material within a binder compatible with the charge 41. Paths of primer material 43 are provided at right angles to the conductive paths 42 in this particular modification. By varying the spacing, size and shape of the patterns the thrust of the rocket or charge can be varied since the internal surface area being ignited at any one instant at a set burning rate is thus changed. The explosions or rapid burning of the charge can be localized at any desired point and progress in any desired direction. The thin strips will normally have a thickness of about 0.010 inch when applied by a spray and 0.025 inch when dipped. Repeated spraying and dipping operations may be performed. The strip width is ordinarily in the range of from a thirty-second to one-half inch.

The primer and conductive films of this invention can be applied to any propellant base structure. Typical of the propellant grains which are useable are Thiokol or polysulfide rubber, acrylic polymers such as methyl-methacrylate, nitro polymers, nitrocellulose, vinyl polymers such as vinyl chloride and epoxy polymers made into single base, composite or double base propellants.

The primer mixture contains an oxidizer material as is used in the prior separate ignitors. Specifically, from about 5 to 95% of the total primer mixture may be an oxidizing material. These materials include barium nitrate, potassium sodium or ammonium perchlorate, sodium, potassium and ammonium nitrate as well as nitroglycerine and other nitrates, chlorates and perchlorates. Various other solid propellants are fully discussed in "Chemistry of Powder and Explosives" by Davis, T. L., 1943, Wiley & Sons, Inc., N.Y., and "Rocket Propulsion Elements" by Sutton, G. P., 1956, Wiley & Sons, Inc., N.Y. An optimum range for the oxidizer is from 30 to 60% by weight. The more oxidizer that is present the more sensitive the mixture is to heat. A stoichiometric ratio of oxidizer is preferred in order to give maximum heat output.

Various binders may be used to adhere the primer layer and the hereinafter described conductive layer or strips to the propellant charge. Generally it is desired to match the binder with the binder used in the particular propellant with which the ignitor film is to be used. Thus Thiokol or polysulfide rubber, acrylic polymers, nitro polymers, nitrocellulose, asphalt and epoxy materials may be employed. An additional advantage of using the same binder in the various layers is the fact that the coefficient of thermal expansion of the charge and the films will more nearly approximate each other. A particularly desired binder is Epon 828 or Epon 815 manufactured by the Shell Chemical Company, the former having a viscosity at 80° F. of 124 poises. This and other of the binders may be cured at temperatures of from 60° to 300° F. the upper temperature limit being governed by the grain heat sensitivity.

It is generally desirous to increase the efficiency of the primer mixture by adding thereto a finely divided fuel such as powdered aluminum, boron, zirconium, copper, manganese, magnesium, iron or nickel, among others, to provide greater heat release and better heat transfer in the mixture. About 10–20% of this fuel is advantageously used in many formulations. The powders employed are of various mesh sizes ranging generally from 10 microns to 100 mesh.

A fast burning material such as pentaerythritoltetranitrate (PETN), lead azide, lead styphnate or a 29% lead thiocyanate 61% potassium chlorate mixture may also be incorporated in proportions of from 0–10% to enhance ignition characteristics. A percentage of from 1–3% is a preferred range.

As is known in the art various catalysts may be employed to accelerate the curing of the variously applied films. These include amine catalysts for the epoxy resins, as well as acid anhydrides such as thallic anhydride and benzoyl peroxide for polyesters.

The preferred form of the conductive material is acetylene black, a form of graphitic carbon. Carbon black as well as graphite itself and silver flake are among other useable conductive mediums. The amount and kind of conductive material added depends on the resistance desired in the film. A range of from 2 to 50%, depending on such resistance, may be used. An optimum figure ranging from 5 to 15% by weight, with a value of 10% being preferred, gives a resistance in the range of from 100 to 500 ohms. Acetylene black is a preferred material since its drift characteristic after extended storage is relatively low.

Precut pressure sensitive masks or tapes and electroformed metal masks may be employed for applying the alternating patterns of primer and conductive materials to the grain. The films themselves may be placed on the unmasked portions of the grains by dipping, spraying or by fill and drain techniques. A complete combined grain and ignitor is made by forming the grain into the desired configuration and coating the electrically conductive and primer mixtures in the desired patterns on the grain surfaces. These steps are followed by the curing of the binders in each of the conductive material and the primer in order to adhere the films or strips to the grain. In one modification of this method a silicone, Teflon or fatty acid or stearate release agent (i.e. aluminum stearate) is placed on a casting mandrel followed by the above described coating steps. The propellant itself is then cast on these coatings, the entire structure being then cured and removed from the mandrel leaving the conductive film ignitor firmly bonded to the inner surface of the grain. In the alternative the coatings may be applied to a precured propellent grain after which the binder in the films is either thermally or catalytically cured. In using thermoplastic materials they are mixed with suitable solvents, applied to the grain, and the solvent evaporated off.

The invention is more clearly illustrated by the following examples of various mixtures of materials suitable for the multiple coatings of this invention:

EXAMPLE I

A suitable solvent such as toluol or xylol is ground with 29 grams of $Pb(CNS)_2$ with 10 grams of powdered acetylene black and 61% by weight $KClO_4$ in a ball mill for 12 hours or until a major portion of the particles will pass a 100 mesh screen. Ten grams of this mixture is added to an amount of a resin which is equivalent to 5 grams of resin solids, i.e. 10 grams of a mixture of 40 grams of Epon 815 (Shell Chemical Co.), 50 grams of xylol and 10 grams of diethylene triamine. This formulation serves as a low resistance conductive primer mixture.

A mixture of 20 grams of silver flake and 5 grams of the aforementioned resin mixture or a material such as General Cement Silver Print No. 21–2 manufactured by General Cement Manufacturing Company is used for the non-explosive conductive paths.

EXAMPLE II

Xylol solvent is ground with $PbO_2$, 25 grams boron powder and 30 grams of pentaerythritoltetranitrate (PETN). Ten grams of this mixture is added to 5 grams of nitrocellulose ($N_2=12.6\%$) dissolved in 25 grams of 1:1 solution mixture of methyl alcohol and diethyl ether and then thoroughly mixed. This formulation serves as a high resistance conductive primer mixture.

For the conductive paths or strips 20 grams of silver flake is mixed with ten grams of the nitrocellulose solution mentioned above.

EXAMPLE III

Approximately 10 grams zirconium metal (100 mesh) is mixed with 10 grams of PETN and 10 grams of nitrocellulose ($N_2=12.6$). Fifty grams of a 1:1 mixture of methyl alcohol-ether mixture is then added and mixed in a ball mill for two hours. This mass is then applied as the primer film to the grain.

A conductive coating employing 25 grams of acetylene black in the nitrocellulose solution of Example II is used as the conductive film on the grain.

EXAMPLE IV

About 5 grams zirconium powder (100 mesh), 5 grams zirconium dust (10 microns), 30 grams PETN and 20 grams of nitrocellulose ($N_2$=12.6) and 60 grams of a 1:1 mixture of methyl alcohol and ether are mixed by ball milling for two hours. This mixture serves as a high resistance primer pattern.

The conductive paths in any of the above examples may be used with the above.

EXAMPLE V

Approximately 35 grams $PbO_2$, 15 grams fine zirconium (10 microns) 15 grams of PETN, 5 grams graphite, and 30 grams aluminum flake are mixed with 100 grams of Thiokol polysulfide rubber polymer LP-33 (Thiokol Corp.) ball mill forty hours. This LP-33 polymer is prepared from 99.5 mole percent of bis(2-chloroethyl) formal and 0.5 mole percent of trichloropropane and has an average structure of:

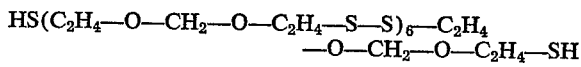

Seven grams of P-quinone dioxamine and 3 grams of diphenylguanidine and a trace of sulfur, as an accelerator for accomplishing the curing of the binder, are then added. When applied this mixture is cured with the grain at 158° F. for 16 hours. This formulation is particularly adaptable for polysulfide rubber type propellent grains. The resistance of this formulation can be varied from 10 to 100,000 ohms and still provide sufficient energy with 15–25 volts D.C. to ignite a polysulfide grain.

For the conductive pattern a mixture of 20 grams of silver flake or acetylene black, depending on the resistance desired, and 10 grams of polysulfide polymer, catalysed as above, along with 10 grams of xylol, is used.

EXAMPLE VI

About 20 grams of barium nitrate, 20 grams PbO, 20 grams PETN, 32.5 grams 100 mesh zirconium and 7.5 grams 10 micron zirconium are mixed with 50 grams of vinyl chloride polymer such as VYHH-type (Bakelite Div. of Union Carbide & Carbon Corp.) and 350 grams of a 1:1 mixture of acetone and toluene in a ball mill for 2 hours. This coating is used as the primer on vinyl base solid propellent grains.

Twenty grams of silver flake or acetylene black in 20 grams of the above vinyl chloride, acetone and toluene solution provides a suitable material for the conductive paths.

I claim:

1. A method of making an ignitor to ignite a propellant grain having a surface, said method including the steps of: coating strips of a material comprising an electrically conductive substance in a binder compatible with said grain on spaced areas of said surface of said grain, coating strips of a conductive pyrotechnic primer material on areas of said surface in electrical continuity with said strips of material comprising said electrically conductive substance, said conductive pyrotechnic primer material including particles of pyrotechnic material and a binder compatible with said grain, said coatings overlapping to provide electrical contact therebetween; and curing said materials at a temperature compatible with grain heat sensitivity to effectively bond said strips of material comprising said electrically conductive substance and said strips of pyrotechnic material to said surface of said grain.

2. A method of igniting a propellant grain having a surface, which method includes the steps of: applying a coating of an electrically conductive pyrotechnic material to said surface in spaced strips; and providing electric conductors connecting the strips for simultaneously sending electrical currents through the strips to effect rapid ignition of said grain in areas of said surface juxtaposed to said strips.

3. A method as defined in claim 2 in which said coating of pyrotechnic material is applied to said surface by first applying said spaced strips of pyrotechnic material and said electric conductors to another surface, then casting the material of said grain in contact with said other surface and its spaced strips of pyrotechnic material and electric conductors, and then removing said other surface while leaving said spaced strips and said conductors adhering to said material of said grain.

4. A combined ignitor and propellant grain comprising a propellant grain having a surface, spaced low-resistance conductors of opposite polarity bonded to said surface, and connecting paths of conductive pyrotechnic material extending between said conductors comprising strips of conductive pyrotechnic material bonded to said surface and electrically connecting said conductors.

5. A combined ignitor and propellant grain as defined in claim 4 in which said connecting strips are coatings comprising a binder containing therein a particulate oxidizer and a particulate conducting material.

6. A combined ignitor and propellant grain as defined in claim 5 in which said particulate conducting material comprises a particulate electrically conductive material selected from the class consisting of acetylene black, carbon black, graphite and silver flake.

7. A combined ignitor and propellant grain as defined in claim 5 in which said binder is compatible with said grain and is selected from the class consisting of thermoplastic and thermosetting binders.

References Cited

UNITED STATES PATENTS

| | | | |
|---|---|---|---|
| 1,102,653 | 7/1914 | Goddard | 60—35.6 |
| 2,696,191 | 12/1954 | Sheehan | 102—28 |
| 2,762,302 | 9/1956 | MacLeod | 102—70.2 |
| 319,628 | 6/1885 | Russell | 102—46 |
| 2,696,710 | 12/1954 | Golden | 60—39.82 |

VERLIN R. PENDEGRASS, *Primary Examiner.*

U.S. Cl. X.R.

60—256; 86—1